Figure 1:
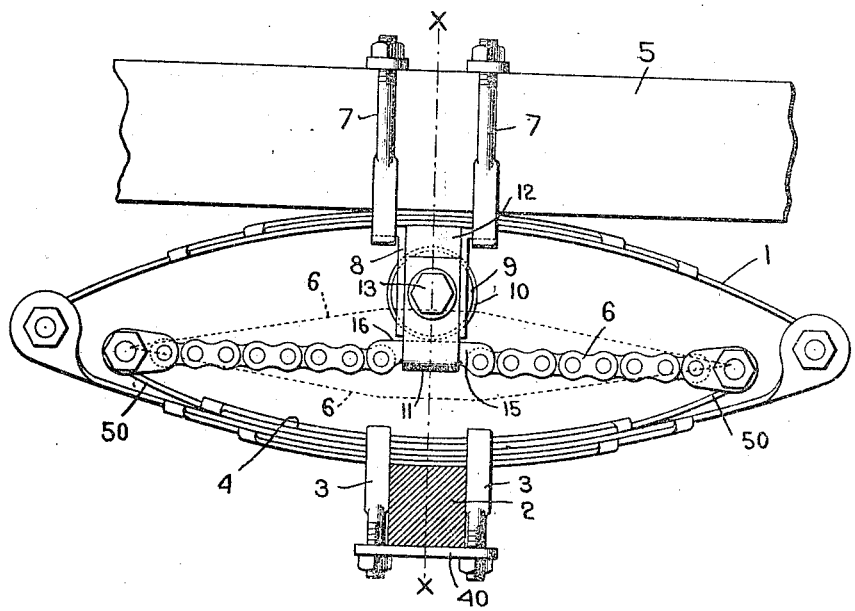

W. E. SHEEHY.
VEHICLE SPRING.
APPLICATION FILED SEPT. 7, 1915.

1,181,176.

Patented May 2, 1916.

Inventor.
William E. Sheehy,
by Heard Smith & Tennant
Att'ys.

UNITED STATES PATENT OFFICE.

WILLIAM E. SHEEHY, OF BOSTON, MASSACHUSETTS.

VEHICLE-SPRING.

1,181,176.

Specification of Letters Patent.

Patented May 2, 1916.

Application filed September 7, 1915. Serial No. 49,159.

*To all whom it may concern:*

Be it known that I, WILLIAM E. SHEEHY, a citizen of the United States, residing at Boston, county of Suffolk, State of Massachusetts, have invented an Improvement in Vehicle-Springs, of which the following description, in connection with the accompanying drawing, is a specification, like characters on the drawing representing like parts.

This invention relates to vehicle springs and especially to springs adapted for use in automobiles, and the principal object of the invention is to provide a spring with novel means which acts both to assist the spring in supporting the load when the spring is heavily loaded, and to retard the recoil of the spring after it has been suddenly compressed. The device therefore acts both as an auxiliary load-supporting spring and as a shock absorber.

In order to give an understanding of my invention, I have illustrated in the drawings a selected embodiment thereof, which will now be described, after which the novel features will be pointed out in the appended claims.

Figure 2:
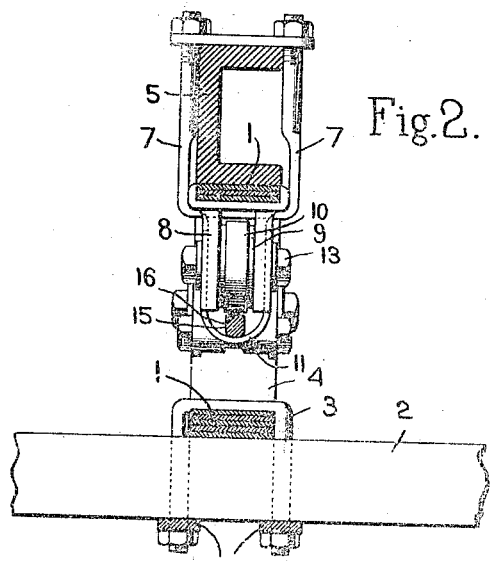
Figure 3:
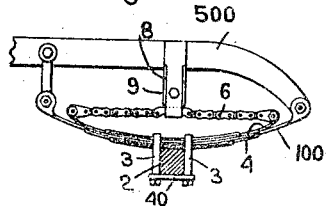

In the drawings Figure 1 is a side view of an elliptical spring embodying my invention. Fig. 2 is a section on the line X—X Fig. 1. Fig. 3 shows a modification of the invention.

I have herein chosen to show my invention as it would be embodied in two types only of springs, but I wish to state at the outset that the invention is not limited in its use to springs of the types illustrated, but is capable of use in connection with other types of springs.

1 indicates an elliptical vehicle spring of any suitable construction, it being shown as secured to the axle 2 of the vehicle by means of the usual clips 3 and clamping plates 40. The upper side of the spring is secured to the frame 5 of the vehicle by the usual spring clips 7.

The parts thus far described are such as may be found in any elliptical vehicle spring, and form no part of my present invention.

My invention includes an auxiliary spring associated with the main spring and constructed so that when the main spring is compressed beyond a certain point, either by reason of being heavily loaded, or by reason of the vehicle running over an obstruction, the auxiliary spring will come into play to resist further compression of the main spring. Said auxiliary spring also has such construction that when the main spring recoils said auxiliary spring will come into play to resist or retard the recoiling movement, thus acting as a shock absorber. In the illustrated embodiment of my invention, this auxiliary spring is shown at 4, and is in the form of a leaf spring. It is fixedly secured at its central portion to the lower part of the main spring, and as a matter of convenience I may employ the clips 3 as a means for securing the auxiliary spring 4 in place. This auxiliary spring 4 is placed on the inside of the spring 1 and the ends 50 thereof are connected by a flexible connection 6, herein shown in the form of a chain. This flexible connection 6 is constructed to hold the auxiliary spring 4 normally in slight tension so that the ends 50 of the spring 4 are normally separated slightly from the lower half of the main spring 1.

The vehicle frame has rigid therewith a device which acts on the chain 6 to flex the latter when the main spring 1 is flexed beyond a predetermined amount, and also when the main spring 1 recoils and opens beyond a predetermined position. The bending or flexing of the chain 6 into the dotted line positions Fig. 1 will draw the ends 50 of the auxiliary spring 4 toward each other, thus placing such spring under increased tension. The spring 4 will, therefore resist any force acting on the chain 6, tending to flex it into either of the dotted line positions Fig. 1.

In the illustrated embodiment of the invention, the upper half of the main spring 1 has a yoke-shaped bracket 8 secured thereto, in the arms of which is pivotedly mounted a roll 9, which is adapted to bear on the upper side of chain 6 when main spring 1 is compressed. I will preferably make the roll 9 with the peripheral portion 10 of leather, rubber or some other yielding material, which will eliminate any noise caused by the engagement of the roll with the chain 6.

11 designates a U-shaped strap of leather or some other suitable material, which encircles the chain 6 and is secured at its ends to the frame 8. For this purpose each side of the frame 8 is shown as provided with a vertical recess at 12, in which the end of the strap 11 is received, said strap being secured to the frame by the pin or stud 13, on which the roll 9 is rotatively mounted. If the spring 1 recoils sufficiently so as to open to a greater extent than the normal position shown in Fig. 1, the strap 11 will engage the chain 6 and flex the latter into the upper dotted line position, thereby flexing the auxiliary spring 4. The resiliency of the auxiliary spring 4 will of course tend to resist this movement, and said spring 4 thus operates to retard or resist the recoil of the main spring 1. It will thus be seen that the auxiliary spring 4 acts both to assist the main spring 1 in supporting the load, after said main spring has been compressed a predetermined amount, and also acts as a shock absorber to resist and retard the recoil of the main spring 1. So long as the main spring 1 is carrying a medium or light load, the auxiliary spring 4 will be comparatively inactive, and this is true during the ordinary movement of the spring 1 in traveling over smooth roads. If, however, the main spring 1 becomes compressed beyond a certain amount, caused by the vehicle wheel passing over an obstruction or dropping into a hole in the road, then the auxiliary spring 4 comes into play and augments the action of the spring 1. The construction of the auxiliary spring 4 is such that its resistance increases very rapidly as the chain 6 is flexed, and it therefore provides a progressively increased resistance both to any undue compression of the main spring 1 and any recoil of said spring.

In Fig. 3 I have illustrated another embodiment of my invention, as it might be applied to the semi-elliptical spring 100. In this embodiment the auxiliary spring 4 is secured to the main spring 100 as illustrated in Fig. 1, and the ends of the auxiliary spring are connected by the flexible connection 6. The means which act on the flexible connection 6 is connected directly to the frame 500 instead of to the upper half of the spring as shown in Fig. 1. This means has the same construction as illustrated in Fig. 1, the only difference being that it is secured directly to the frame 500 of the automobile. The portion of the device shown in Fig. 3 is the same as that illustrated in Figs. 1 and 2.

In some vehicle springs there is likely to be a slight longitudinal movement of the frame relative to the axle, which will result in a movement of the roll 9 longitudinally on the chain 6. In order to get this movement without affecting the portion of the device, I propose to provide the chain 6 with an elongated central link 15, with which the roll 9 has engagement, said link being provided with a flat surface 16, which is situated slightly above the top surface of the chain 6. If there is any longitudinal movement of the frame relative to the axle 2, the roll 9 will simply roll back and forth on the surface 16. The roll 9, therefore will have engagement with the flat, straight surface 16, even when the chain 6 is flexed into either of the dotted line positions.

While I have illustrated herein a selected embodiment of my invention, I do not wish to be limited to the constructional features shown as the principle of the invention might be applied to springs of other types than that herein illustrated.

Having fully described my invention, what I claim as new and desire to secure by Letters Patent is:—

1. In a vehicle spring, the combination with a main leaf spring, of a curved auxiliary leaf spring secured intermediate of its ends to the main spring, a flexible connection connecting the ends of the auxiliary spring, and means for flexing said connection, and thus placing the auxiliary spring under increased tension by flexing movement of the main spring.

2. In a vehicle spring, the combination with a main spring, of an auxiliary leaf spring secured intermediate of its ends to the main spring, a flexible connection connecting the ends of the auxiliary spring, means adapted to engage and flex the flexible connection, thereby placing the auxiliary spring under increased tension whenever the main spring either recoils beyond a predetermined point or is compressed beyond a predetermined point.

3. In a vehicle spring, the combination with a vehicle frame and an axle of a main spring between said frame and axle, an auxiliary leaf spring secured intermediate of its ends to the main spring, a chain connecting the ends of the auxiliary spring, a bracket rigid with the frame, a roll carried by said bracket and adapted to engage the top of the chain, and a strap carried by said bracket and encircling said chain whereby said chain is flexed and the auxiliary spring placed under increased tension whenever the main spring recoils or is compressed.

In testimony whereof, I have signed my name to this specification.

WILLIAM E. SHEEHY.